Aug. 16, 1927.
S. SCHIFF
1,639,061
TRAY DISCHARGING MECHANISM
Original Filed Jan. 21, 1921   2 Sheets-Sheet 1
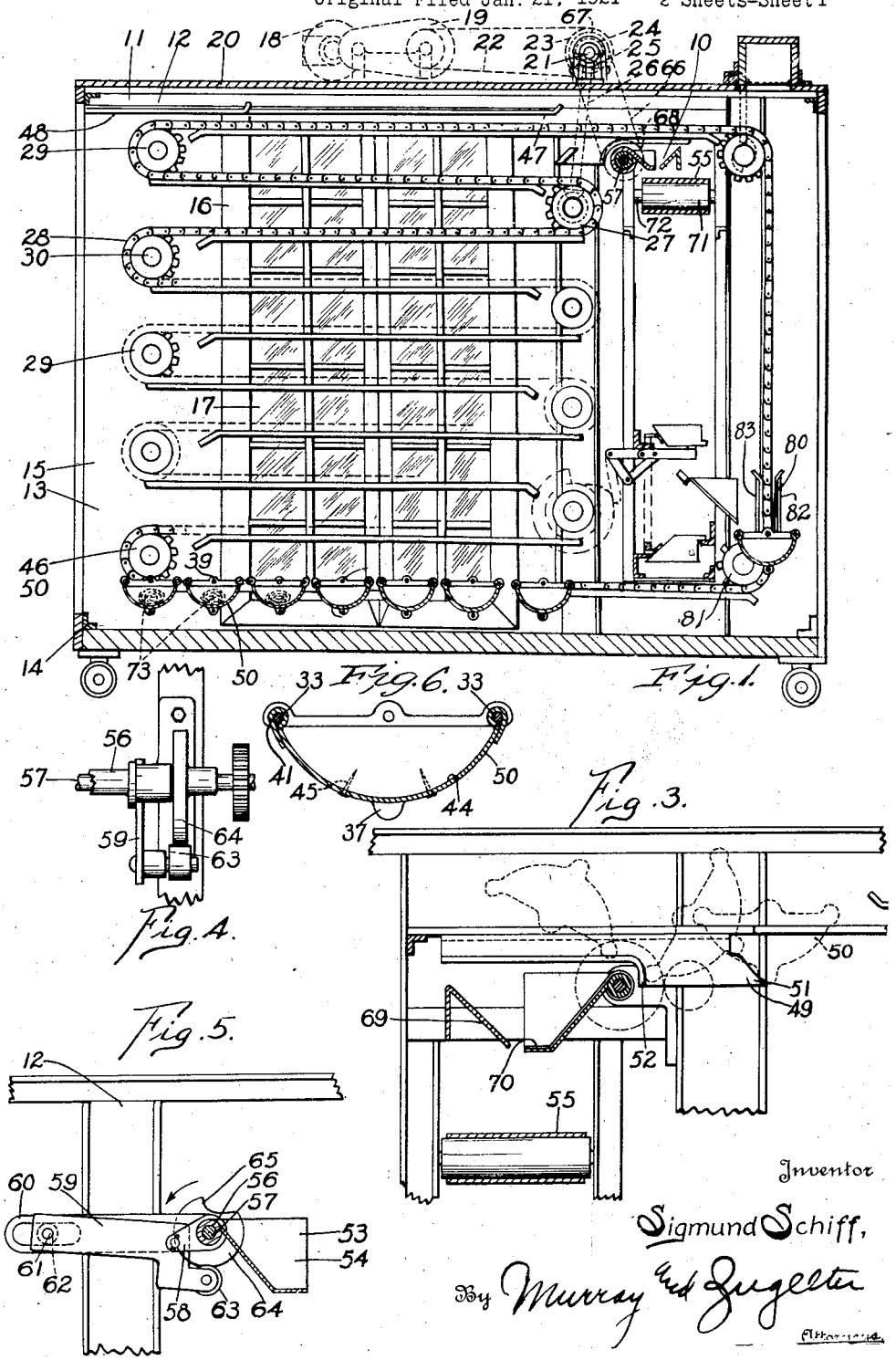
Inventor
Sigmund Schiff,
By Murray and Zugelter Aug. 16, 1927.
S. SCHIFF
1,639,061
TRAY DISCHARGING MECHANISM
Original Filed Jan. 21, 1921  2 Sheets-Sheet 2
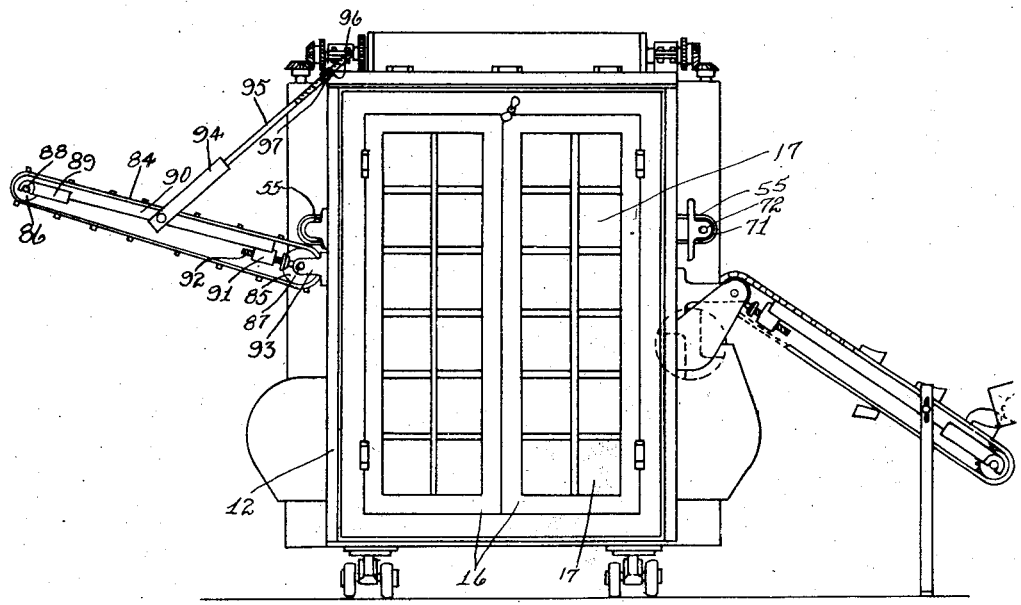
Fig. 8.
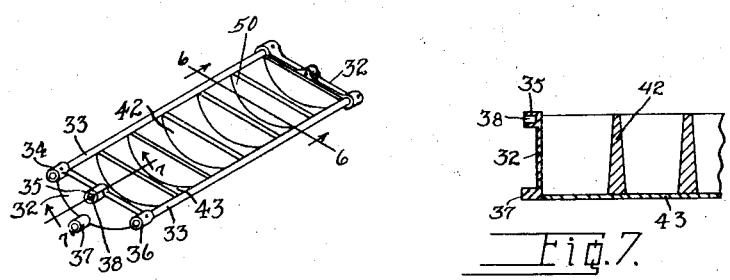
Fig. 2.
Fig. 7.
Inventor
SIGMUND SCHIFF,
By Murray and Gugelter
Attorneys Patented Aug. 16, 1927.

1,639,061

UNITED STATES PATENT OFFICE.

SIGMUND SCHIFF, OF CINCINNATI, OHIO, ASSIGNOR TO THE J. H. DAY COMPANY, OF CINCINNATI, OHIO, A CORPORATION OF OHIO.

TRAY-DISCHARGING MECHANISM.

Original application filed January 21, 1921, Serial No. 439,015, Patent No. 1,575,282, dated March 2, 1926. Divided and this application filed November 12, 1925. Serial No. 68,732.

This application is a division of my co-pending application, Serial No. 439,015, filed January 21, 1921.

The invention relates to improvements in discharge devices for automatic proofers.

An object of my invention is to provide an automatic discharge device for proofers that will discharge the several lumps of dough in such a position as to preclude the said lumps from contacting one another and uniting to form large masses of dough.

Another object of my invention is to provide a device of the class referred to in which the possibility of breaking the skin of the individual lumps of dough would be reduced to a minimum.

Another object of my invention is to provide a device that is simple of construction and economical of operation to perform the above objects.

These and other objects are attained by the means described herein and disclosed in the accompanying drawings, in which:

Fig. 1 is a longitudinal section of a proofer having embodied therein a device of my invention.

Fig. 2 is an enlarged perspective view of a tray forming a detail of my invention.

Fig. 3 is an enlarged diagrammatic view of part of the discharge mechanism forming a detail of my invention.

Fig. 4 is an enlarged front elevation of the parts shown in Fig. 5.

Fig. 5 is an enlarged sectional view of part of the discharge mechanism forming a detail of my invention.

Fig. 6 is a sectional view taken on line 6—6 of Fig. 2.

Fig. 7 is a sectional view taken on line 7—7 of Fig. 2.

Fig. 8 is a front plan view of the proofer having embodied therein the improvements of this invention.

The discharge mechanism of my device, indicated generally as 10, is shown in Fig. 1 in operative connection with a dough proofing machine, such as is set forth in my co-pending application, Serial No. 439,015, filed January 21, 1921, Patent Number 1,575,282, March 2, 1926 and of which this is a divisional application.

The discharging mechanism 10, shown in Fig. 1, is operatively connected with a dough proofing device 11. The proofer comprises a casing 12 within which are disposed a series of trays that are supported between endless chains that are moved through such casing, carrying the dough during the proofing period. The discharge device 10 extends partly within and partly without the casing, and is adapted to empty the trays and to carry the individual lumps of dough out of the casing 12, and to discharge individual lumps of dough separately and singly into any suitable device that is to then work upon the dough, which ordinarily is a molder. The proofer casing 12 is preferably of rectangular construction and has side frames 13. The frames are formed primarily of angle irons and channel irons and are secured upon one another by means of angle and channel irons 14 extending between the frames. The spaces between the angle irons and channel irons are enclosed by any suitable material such as wood so as to provide the enclosed chamber 15. A series of doors 16 are mounted upon the sides and ends of the casing. These doors have glass panels 17 mounted in them. The chamber formed interiorly of the casing comprises a proofing chamber 15.

Suitable driving means, such as a motor 18 and speed change mechanism such as 19 may be mounted on the top 20 of the casing, or any other means of power may be employed to impart rotary motion to the transverse shaft 21 mounted upon the top of the casing. I have illustrated a motor and change speed device mounted on the casing adapted to impart motion to the shaft 21 by means of a chain 22 engaging the sprocket wheel 23 mounted on shaft 21. The shaft 21 is adapted to drive by means of bevel gears 24 and 25, the vertical shaft 26 mounted upon the side of the casing and transmitting power to the driving sprocket 27. The driving sprocket 27 drives the endless chain 28 which in turn drives a chain disposed at the other side of the proofing chamber 15 and between which chains the trays 50 are disposed. Chain 28 passes around a series of sprocket wheels 29 disposed interiorly of the casing and mounted upon individual stud shafts 30 mounted on the sides 13 of the casing 12. This construction eliminates the transverse shafts that otherwise extend through the casing and require considerable enlargement of the sprocket wheels to permit free movement of the trays about such transverse shafts. The sprocket wheels are mounted upon the sides of the casing in staggered relation, the wheels on one side of the casing being directly opposed to those on the opposite side of the casing. A series of chain supports 31 extend between the sprocket wheels and support chains in a horizontal plane as they pass from one sprocket wheel to the sprocket wheel next above. These chain supports also support the trays 50, because the trays are mounted between the chains 28, one of which is disposed upon each side of the casing.

The trays 50 comprise end members 32 between which are secured the cross bars 33. A series of lugs 34, 35, 36 and 37 extend outwardly from the end members 32. There are three cross members 33, one at each side of the top of the trays and one at the bottom of the tray. The ends of the cross members are inserted in the lugs 34, 36 and 37, consequently the lugs 34 and 36 are disposed at opposite sides of the top of the end members and lug 37 at the bottom of the end member. The support lug 35 is formed midway between the two uppermost lugs 34 and 36 and has a central bore 38 into which extend pins 39, projecting from the chains 28. The lug 35 and the lower most lug 37 are normally in vertical alignment. The lugs 34, 35 and 36 are normally in horizontal alignment. The bottom 40 of the tray is preferably made of canvas and has a loop 41 formed along its side edges through which loops the cross bars 33 extend. A series of partitions 42 divide the tray into a series of compartments 43. These partitions are preferably wedged shape, being narrower at their tops and wider at their bottoms. The upper and outer ends of the partitions engage below the upper most cross bars 33, and span the canvas along their lower and rounded edge 44. Suitable means, such as tacks 45, are employed to secure the partitions in place and co-operate with the tension due to the seating of the partitions as described, in positioning the partitions at determined places throughout the length of the tray.

The trays are carried by the chains 28 in spaced relation and pass from the front of the casing to the rear thereof over the lower most sprocket 46. The tray is moved backward and forward in successive horizontal planes through the casing 12 by means of chains 28 passing over the series of sprocket wheels 29 and being supported by the sections of support members 31, as it is moved from one sprocket wheel to the next. The trays 50 receive their charge of dough at the lower right-hand corner of the proofer chamber. The chains after passing over the driving sprocket 27 descend through a guide 80 to and about a sprocket 81. The guide 80 comprises two parallel vertical rods 82 and 83 having outwardly projecting arms at their upper ends. The rod 83 extends slightly below the axis of the stud shaft supporting the sprocket 81, and rod 82 preferably extends somewhat lower than the rod 81. The purpose of this guide is to prevent lateral movement of the trays while being loaded, which lateral movement is precluded by the lugs 35 and 37 passing between the rods 82 and 83. When the tray has reached the uppermost supporting member 47, it moves forward toward the discharge mechanism 10. In order to assure the tray assuming a normal position when it reaches the discharge mechanism, a leveling bar 48 is mounted on the side of the casing immediately above the uppermost section of the chain 28. This bar extends toward the center of the casing to such extent that it will project over the lugs on the trays and assures the lugs 34, 35 and 36 being in horizontal alignment as the tray moves over the uppermost support 47.

The discharge device 10 embraces a cam 49 adapted to tilt and invert the trays 50 so that the dough will pass from the tray to a belt that carries the dough out of the casing. The cam 49 has an inclined and outwardly projecting tilting lug 51 that is engaged by the lowermost lug 37 of the tray as the tray moves forward in the casing. As the tray moves forward, the lug 37 is raised, whereupon the lug 34 is lowered and the lug 36 elevated. On the forward end of the cam is formed an outwardly projecting inverting lug 52 that is curved upward and toward the front of the casing. This lug 52 is engaged by the lug 34. Immediately upon engagement of the lug 34 and the inverting lug 52, the lug 37 upon the bottom of the tray reaches the upper end of the tilting lug 51 whereby the movement of the tray is controlled by the contact of the lug 34 upon the inverting lug 52 and by the movement of the chain 28. As the chain 28 moves forward, the lug 34 remains practically stationary in relation to the inverting lug 52, and therefore the forward movement of the chain tending to turn the tray about the point of contact between lugs 34 and 51 causes the tray to be inverted. As the tray moves forward, the lug 34 continues to ride on the lug 52 until the contact is broken between these two lugs whereupon the tray assumes its normal position. When the tray is inverted, it discharges the individual lumps of dough in the several tray compartments, into a holder 53 having a series of individual discharge compartments 54. These discharge compartments are formed adjacent one another and over a discharge belt 55. The rear wall of the holder 53 is inclined upwardly and at its upper end it is mounted upon a sleeve 56 pivotally mounted upon a transverse shaft 57. The sleeve 56 has a link 58 extending therefrom and pivotally attached to the link is a reciprocating roller arm 59, one end of which is pivotally supported in a slotted bracket 60 mounted upon the casing 12 in any suitable manner. A pin 61 extending from arm 59 extends through the slot in the bracket 60 and has mounted upon it a collar 62 that engages the walls of the slot in the bracket 60. A roller 63 is mounted on the roller arm 59 and this roller engages cam 64 mounted upon the shaft 57. The cam 64 has a notch 65 formed in its outer edge, which cam is engaged by the roller 63. The shaft 57 is driven by means of a chain 66 extending about a sprocket 67 mounted on shaft 21 and a sprocket 68 mounted on the shaft 57. In the normal or elevated position of the holder, the dough discharged into the discharge compartment is retained in such compartment. The discharge of the dough from the tray compartments is accomplished in a new and novel manner. As the tray 50 moves beyond the the second position of the tray, as shown in Fig. 3, the lumps of dough move along the bottom of the tray compartments and are moved onto the sleeve 56. At the time that the dough is moved on to the sleeve 56, the holder, and therefore the discharge compartments are lowered and are in their discharging positions. As the sleeve 56 turns, because of the holder 53 being raised by the action of the cam 64 and roller 63, the cross bar 33 extending between the lugs 34 on the tray 50 is moved forward and pushes the lumps of dough off of the sleeve 56 into the discharge compartments. The clearance between cross bar 33 and the sleeve 56 must be such that this action results. If too little clearance is given, the dough is pinched by the relative movements of the tray and sleeve and the skin of the lump is broken, and some of the dough will stick to the canvas on the sleeve. If too much clearance is allowed, the dough will be moved backward below the cross bar 33 as the sleeve is rotated to raise the discharge compartments. When the roller 63 registers with the notch 65 in the cam 64, the weight of the dough and the weight of the holder causes the roller to enter the notch 65 whereby the sleeve 56, shown in Fig. 3, will move in a counterclockwise direction whereupon by the tilting of the holder, the dough is discharged upon the belt 55. To shift primarily discharge of the dough from the compartments 54, an inclined plate 69 is mounted adjacent the forward end or mouth of the compartments, the lower edge of the plate terminating inwardly adjacent the bottom of the mouth of the compartments 54. A suitable covering 70, preferably canvas, is placed over the inner surface of the compartments and extends about the sleeve 56. The movement of the trays, the holder 53 and the discharge belt 55 bear such relation that the compartments will be emptied any time that a tray has discharged its dough into the compartments, so that all the dough that has been discharged upon the belt 55 has been carried from below the compartments by the time the compartments are again discharged. The belt 55 is moved by means of rollers 71 mounted upon shafts 72, supported between brackets mounted on the opposite sides of the casing 12. One of the shafts 72 may be driven from the shaft 21 by any suitable means.

The discharge belt 55 overlaps and discharges onto a separator or spacer belt 84. The separator or spacer belt 84 extends about pulleys 85 and 86. The driving pulley 85 is mounted on a shaft 87 and may be driven by any suitable means while the pulley 86 is mounted on shaft 88. The shaft 88 is held in position by means of a bracket 89 mounted on support 90 having the block 91 mounted thereon and through which block extends an adjustable screw 92. The adjustable screw 92 is adapted to engage the bracket 93, supporting the shaft 87, whereby the spacer belt 84 may be tensioned. The support 90 is held in adjusted position and adjusted at various angles to the casing 12 by means of a yoke 94 which is pivotally attached to the support 90 and has extending therefrom a rod 95 the upper end of which is screw threaded and has mounted upon it an adjustable nut 96. The threaded end of the rod 95 extends through a slotted bracket 97 mounted on the casing 12 and the nut 96 serves as an abutment engaging the bracket 97 and determining the position of the support 90 and consequently that of the belt 84. It should be noted that the spacer belt 84 is moved faster than the belt 55 so that successive lumps of dough are not deposited upon one another.

The operation of my device is as follows:

Lumps of dough 73 are disposed, by any suitable means, into the compartments 43 of the tray 50. The tray 50 is hingedly mounted on the chains 28 and are moved along the lowermost portion of the proofing chamber 13. The trays are then moved along the supports 31 during which time the dough is undergoing the proofing process. As the tray is moved toward the highest level of the chains 28, they approach the bar 48 which projects outward over the lugs 34, 35, and 36 on the trays 50 and assures the trays assuming such position that the referred to lugs will be in horizontal alignment as the trays move toward the discharge mechanism 10. The lug 37 upon the tray abuts the lug 51 on the cam 49 thereby raising the lug 37 and causing the lug 34 to engage the lug 52 on the cam 49. This contact of the lugs 34 and 52 causes the tray to be inverted by the continued movement of the chains 28, whereupon the dough is discharged from the trays 50 into the compartments 54 as previously explained. Immediately after the discharge of the dough into the compartments 54, the dough is discharged from the compartments 54 upon the belt 55 by the registration of the roller 63 with the notch 65 and the consequent dropping of the holder. The plate 69 prevents premature discharge of the dough from the holder, should any of the dough in the tray compartments discharge more quickly than other balls of dough in other tray compartments. The tray then moves to a position for receiving a new charge of dough. After the dough has been discharged upon the belt 55, it is carried out of the proofing chamber by means of the belt 55 and may be deposited upon another belt. The belt 55 is actuated at such rate of speed that the last of the belts of dough have just passed from beneath the holder when the holder again discharges.

All of the mechanisms are operated from the shaft 21, therefore when the various parts of the machine have been adjusted to their proper co-operating relation, they will retain such co-operating relation at all times. The shaft 21 may have power transmitted to it from any suitable source, the speed of the shaft 21 may be so regulated or modified to give the desired period of proofing to the dough.

What I claim is:

1. A tray for use in a proofing device and comprising end members, cross bars joining the end members, a flexible bottom mounted upon the cross bars, and spaced partitions disposed intermediate the end members of the tray and supported between the cross bars and spanning the flexible material and forming a plurality of distinct compartments between the end members.

2. A tray for use in a proofing device and comprising end members, on each end member a series of lugs in horizontal alignment and a series of lugs in vertical alignment, one lug being common to both series and having a central bore adapted to seat a tray supporting pin.

3. A tray for use in a proofing device and comprising end members, on each end member a series of lugs in horizontal alignment, and a series of lugs in vertical alignment, one lug being common to both series, such common lug having a bore therein adapted to seat a tray supporting pin, cross bars joining the end members, a flexible bottom mounted on the cross bars, and partitions supported between the cross bars and spanning the flexible bottom.

4. In a proofing device having automatic loading and discharging mechanisms the combination of endless chains mounted upon opposite sides of the proofer, pins extending from the links of the chains, trays mounted pivotally upon the pins, and lugs on the trays adapted to cooperate with the loading and discharging devices whereby to preclude lateral displacement of the trays during the loading thereof and to invert the trays for the discharging thereof.

5. In a proofer the combination with trays, having compartments therein, and means to move the trays through the proofer, of an automatic discharge device comprising a holder, a series of discharge compartments in the holder, means to discharge one tray compartment into one of each of the discharge compartments, a discharge belt below the holder, a separator belt overhung by the discharge belt, and means to simultaneously discharge all of the discharge compartments.

6. In a proofer the combination with trays, lugs on the trays, and means to move the trays through the proofer, of an automatic discharge device comprising an oscillating holder mounted in the proofer adapted in its normal position to retain lumps of dough, a discharge belt below the holder, lugs mounted on the casing adapted to engage the lugs on the tray and to invert the trays over the holder, and means to oscillate the holder whereby the holder will discharge upon the discharge belt.

7. In a proofer the combination with trays, lugs on the trays and means to move the trays through the proofer, of an automatic discharge device comprising a discharge belt, a transverse shaft, a sleeve mounted revolubly upon the transverse shaft, a holder mounted upon the sleeve, and overhanging the discharge belt, and adapted in its normal position to retain lumps of dough, a tilting lug mounted on the casing adapted to engage a lug on a tray and tilt the tray toward the transverse shaft, an inverting lug mounted on the casing adapted to engage a lug on the tray and to invert the tray as it passes over the sleeve whereby the contents of the tray is deposited upon the top of the sleeve and is then pushed forwardly into the holder by the forward movement of the tray, and means to lower the holder when the dough has entered thereinto, whereby the holder discharges upon the discharge belt.

8. In a proofer tray discharge mechanism the combination of a revoluble shaft, a sleeve mounted revolubly upon the shaft, a holder mounted on the sleeve, means to discharge a tray into the holder, a cam mounted on the revoluble shaft, a link mounted on the sleeve, a reciprocating roller arm, a roller mounted on the roller arm engaging the cam, and a pivot connecting the roller arm and the link.

9. In a proofer tray discharge mechanism the combination of a revoluble shaft, a sleeve mounted revolubly upon the shaft, a holder mounted on the sleeve, means to discharge a tray into the holder, a cam mounted on the revoluble shaft, a link mounted on the sleeve, a reciprocating roller arm, a roller mounted on the roller arm engaging the cam, a pivot connecting the roller arm and the link and a discharge belt disposed below the holder.

10. In a proofer tray discharge mechanism the combination of a revoluble shaft, a notched cam mounted on the shaft, a sleeve mounted revolubly upon the shaft, a holder mounted on the sleeve, means to discharge a tray into the holder, a plate mounted adjacent the forward end of the holder, the plate and holder being adapted to support lumps of dough discharged into the holder, a link mounted on the sleeve, a reciprocating roller arm engaging the cam, and a pivot connecting the roller arm and the link, the holder being adapted to discharge its contents when the roller registers with the notch in the cam.

11. In a proofer tray discharge mechanism the combination of a revoluble shaft, a notched cam mounted on the shaft, a sleeve mounted revolubly upon the shaft, a holder mounted on the sleeve, means to discharge a tray into the holder, a plate mounted adjacent the forward end of the holder, the plate and holder being adapted to support lumps of dough discharged into the holder, a link mounted on the sleeve, a reciprocating roller arm engaging the cam, a pivot connecting the roller arm and the link, the holder being adapted to discharge its contents when the roller registers with the notch in the cam, and a discharge belt disposed below the holder and the plate.

12. A tray discharge device comprising trays having a series of lugs normally in horizontal alignment and a series of lugs normally in vertical alignment, a chain, pins extending from the chain and engaging the tray, a cam mounted adjacent the chain, means to move the chain past the cam, a tilting lug on the cam adapted to engage the lowermost of the vertically aligned lugs on the tray, and to elevate such lug, an inverting lug on the cam adapted to engage the foremost of the horizontally aligned lugs on the tray when the tilting lug has raised the lug in engagement therewith, the inverting lug being adapted to restrain the lug on the tray in engagement with such inverting lug until the tray has been inverted, and a holder mounted adjacent the cam and into which the tray discharges.

13. A tray discharge device comprising trays having a series of lugs normally in horizontal alignment and a series of lugs normally in vertical alignment, chains, pins extending from the chains and engaging the trays, a cam mounted adjacent a chain, means to move the chains, a tilting lug on the cam adapted to engage the lowermost of the vertically aligned lugs on the tray, and to elevate such lug, an inverting lug on the cam adapted to engage the foremost of the horizontally aligned lugs on the tray when the tilting lug has raised the lug in engagement therewith, the inverting lug being adapted to restrain the lug on the tray in engagement with such inverting lug until the tray has been inverted, a transverse shaft mounted adjacent the cam, a sleeve mounted on the shaft, upon which the trays discharge, means to revolve the shaft, a notched cam on the shaft, a reciprocating roller arm engaging the cam, a link extending from the sleeve, and pivotally engaging the roller arm, a holder mounted on the sleeve, the notched cam and the roller arm being adapted normally to retain the holder in a raised position, the tray being adapted to move a deposit of dough from the sleeve into the holder, and a discharge belt disposed below the holder.

14. In a tray discharge device the combination with trays and means for inverting the trays for discharging the trays of an oscillating holder for receiving discharged articles from inverted trays, a conveyor below the holder, means for oscillating the holder and comprising a cam and a lever controlled by the cam and connected with the holder, and means for moving trays over the holder and for operating the cam.

In testimony whereof, I have hereunto subscribed my name this 6th day of November 1925.

SIGMUND SCHIFF.